United States Patent [19]

Fuchs

[11] Patent Number: 4,749,094
[45] Date of Patent: Jun. 7, 1988

[54] MOLDED PLASTIC TAMPERING-INDICATING CLOSURE AND APPARATUS FOR MANUFACTURE THEREOF

[75] Inventor: Timothy J. Fuchs, Toledo, Ohio
[73] Assignee: Owens-Illinois Closure Inc., Toledo, Ohio
[21] Appl. No.: 258
[22] Filed: Jan. 2, 1987
[51] Int. Cl.⁴ ............................................. B65D 41/34
[52] U.S. Cl. ............................................. 215/252
[58] Field of Search ............................... 215/252, 256

[56] References Cited

U.S. PATENT DOCUMENTS 4,497,765  2/1985  Wilde et al. ....................... 215/252

*Primary Examiner*—Stephen Marcus
*Assistant Examiner*—Nova Stucker

[57] ABSTRACT

An internally threaded, molded plastic tamper-indicating closure with a marginal portion of the closure skirt having a plurality of wings projecting non-radially inwardly to engage the underside of a flange on the finish of a container to which the closure is to be applied to separate the marginal portion of the closure from the portion thereabove at a weakening line therebetween, the closure being removed by unscrewing it from the core pin of the molding tooling against which it is molded and having inwardly extending and downwardly projecting ribs on the inside of closure skirt above the wings to impart rotation to an annular portion of the core pin that is rotatable with respect to another portion of the core pin, upon the unscrewing of the closure from the core pin, such rotation of the annular portion being in the same direction as the direction of rotation of the closure as it is being unscrewed to help remove the wings of the closure from the core pin upon the unscrewing of the closure therefrom.

7 Claims, 3 Drawing Sheets

MOLDED PLASTIC TAMPERING-INDICATING CLOSURE AND APPARATUS FOR MANUFACTURE THEREOF

BACKGROUND OF THE INVENTION

1. Field of the Invention

This invention relates to a molded plastic tamper-indicating plastic closure, which closure is provided with a tamper-indicating band at the bottom marginal portion thereof with integrally formed tamper-indicating wings extending inwardly from such tamper-indicating band, and this invention further relates to a molding apparatus in which the closure is removed from the core pin of the apparatus by an unscrewing action.

2. Description of the Prior Art

As is known in the prior art, in the molding of a plastic closure for a beverage or other container, it is known that the closure may be removed from the core pin on which it is molded either by a stripping action or by an unscrewing action. While the removal of the closure by a stripping action is generally a less expensive manufacturing procedure, greater resistance to stripping of the closure on the threaded finish portion of the container to which it is to be applied, both during the initial application of the closure to the container or during any subsequent reapplication of the closure to the container, is obtained by unscrewing the closure from the molding equipment core pin, since the closure thread profile which is necessary to permit stripping of the closure from the molding equipment core pin will also make the closure more subject to stripping on the container finish.

Many types of molded plastic closures for beverage containers and for other types of containers are advantageously provided with tamper-indicating bands, to provide a visually detectable indication to the consumer, upon the first opening of the container, of any prior opening or attempted opening of the container. Many such tamper-indicating closure designs require a heat-shrinking or other operation, subsequent to the application of the closure to the container, to provide or ensure that the package containing such closure does have suitable tamper-indicating characteristics. See, for example, U.S. Pat. No. 4,206,851 (E. M. Ostrowsky) which describes a molded plastic tamper-indicating closure in which the tamper-indicating characteristics of the closure are provided by an annular band which depends from the underside of the closure skirt and which is shrunken in diameter by a heating operation to engage the underside of a flange on the finish of the container, a construction which causes such tamper-indicating band to fracture from the skirt of the closure upon the unscrewing of the closure. However, it is frequently desired to avoid the need for a subsequent heat-shrinking or other secondary processing operation on a closure once it has been applied to a filled container to create or to ensure proper tamper-indicating characteristics upon the removal or attempted removal of the closure from the container. U.S. Pat. No. 4,407,422 (S. L. Wilde, et al.) discloses a molded plastic, tamper-indicating closure which, in the embodiment of FIG. 4, derives its tamper-indicating characteristics mechanically, without the need for any heat shrinking or other subsequent processing operation, from a plurality of non-radially extending fingers or wings which are attached to the inside of the tamper-indicating band at the margin or bottom of the closure skirt. However, heretofore it has not been possible to manufacture a molded plastic, tamper-indicating closure of the type illustrated in the aforesaid U.S. Pat. No. 4,407,422 except by a stripping operation, due to interference in the closure molding tooling between the tamper-indicating fingers or wings and the portion of the tooling that is used to form such tamper-indicating fingers or wings.

SUMMARY OF THE INVENTION

According to the present invention, there is provided a novel molded plastic tamper-indicating closure, and an apparatus for manufacturing such closure, which derives its tamper-indicating characteristics from a plurality of fingers or wings which extend inwardly from a tamper-indicating band portion of such closure, and which is removed from the core pin of the closure molding tooling by an unscrewing operation, to provide the closure with enhanced resistance to stripping upon the application or the reapplication of such closure to a container. The skirt of the closure of the present invention is provided at a location above the location of the tamper-indicating fingers or wings with a plurality of downwardly directed ribs, each such rib extending downwardly at an angle which is greater than the upward angle of the helical thread of such closure. The tooling for molding such a closure is provided with a stationary core pin against which a major portion of the closure is formed, such core pin being provided with an annular member which is rotatable with respect to the core pin and which forms the portion of the molding tooling against which the marginal portion of the closure skirt, including the tamper-indicating band, the tamper-indicating fingers or wings, and the ribs, is formed. Upon the removal of the molded closure from the core pin by unscrewing, the ribs of the closure skirt engage the annular portion of the molding tooling and cause the same to rotate at a greater velocity than the velocity the of the unscrewing of the closure from the core pin, thus freeing the tamper-indicating fingers or wings from the recesses of the molding tooling in which they are formed. In addition to facilitating the molding of a tamper-indicating plastic closure having integral tamper-indicating fingers or wings by a process in which such closure is removed from the molding tooling by an unscrewing operation, the inclined ribs of the closure serve to prevent the permanent separation of the tamper-indicating band of the closure from the remainder of the closure, upon the opening of the container, by tethering the tamper-indicating band to the remainder of the closure in a way which facilitates the disposition of all portions of the closure, in unison, when the closure is discarded, while, nonetheless, providing a suitable visual indication of the first opening or attempted opening of the closure.

Accordingly, it is an object of the present invention to provide a novel tamper-indicating, molded plastic closure. More particularly, it is an object of the present invention to provide a tamper-indicating, molded plastic closure which has high resistance to stripping upon application or reapplication to a container, by virtue of being molded by a process in which such closure is removed from the core pin against which it is molded by an unscrewing operation, and which derives its tamper-indicating characteristics from a marginal, tamper-indicating band that has a plurality of integral fingers or wings extending inwardly therefrom.

It is also an object of the present invention to provide apparatus for molding a tamper-indicating plastic closure in which such closure is removed from the core pin of the molding tooling by an unscrewing operation and in which the tamper-indicating characteristics of the closure are provided a tamper-indicating band that has a plurality of fingers or wings formed integrally therewith and projecting inwardly therefrom.

For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
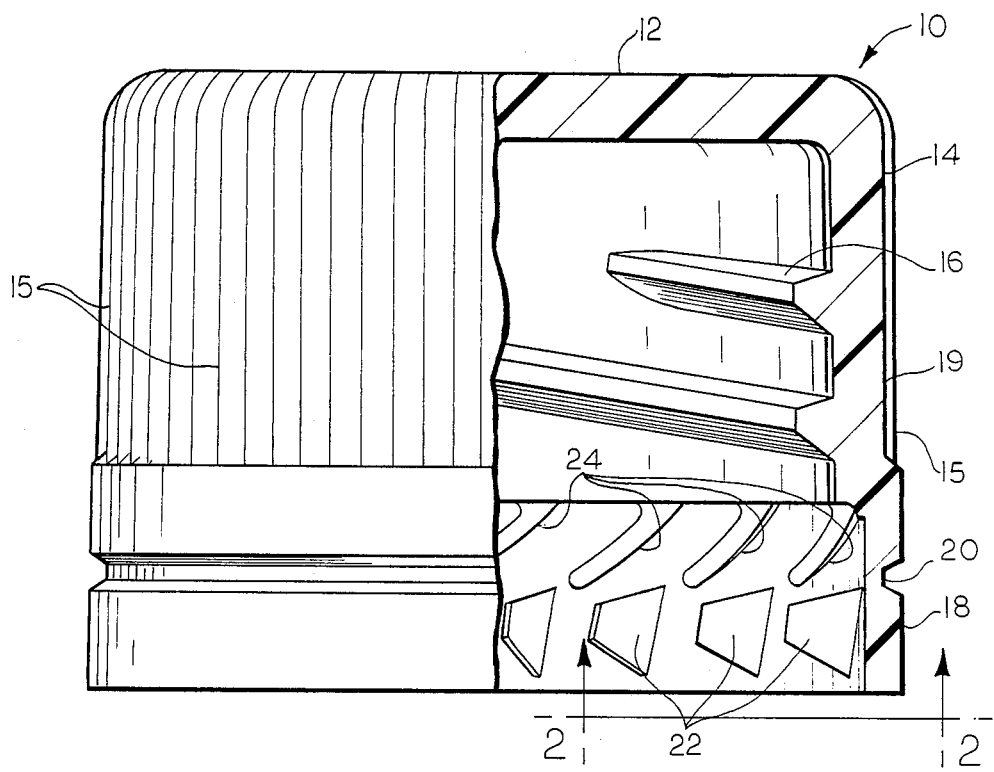
FIG. 1 is an elevational view, partly in cross-section, of a preferred embodiment of a molded plastic, tamper-indicating closure according to the present invention.
Figure 3:
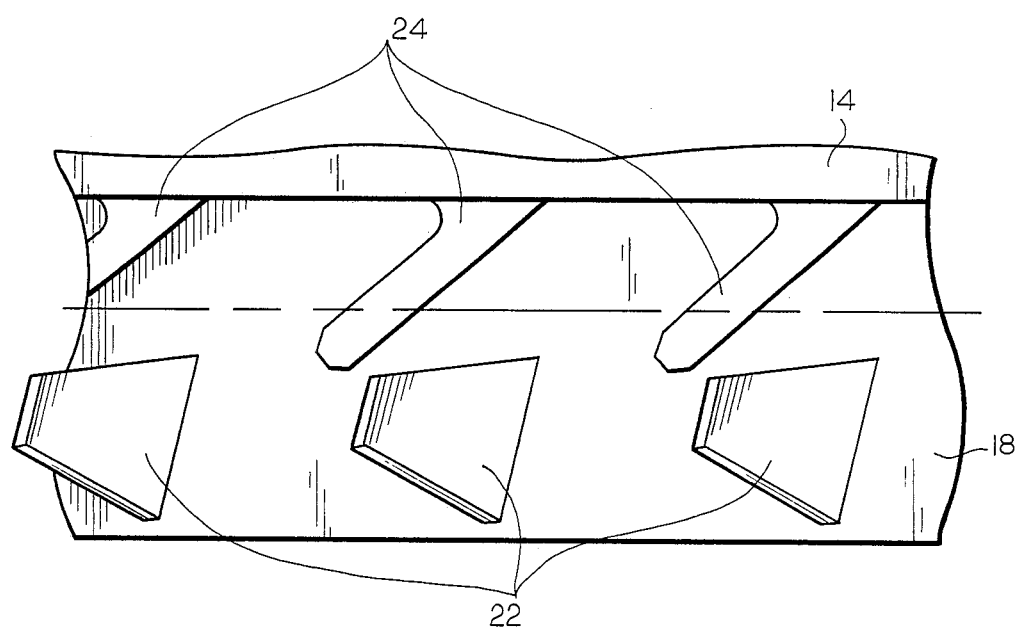
FIG. 3 is a fragmentary developed view, at an enlarged scale, of the closure of FIGS. 1 and 2.

A closure according to the preferred embodiment of the present invention is indicated generally by the reference numeral 10 in the drawing. The closure 10 has a generally horizontally disposed top panel portion 12 which is adapted to span and seal against the rim at the top of the finish of a glass or plastic container, not shown, to which the closure 10 is to be applied. The closure 10 further comprises an annular skirt portion 14 which, preferably, is formed integrally with the top panel portion 12 and which depends downwardly therefrom to surround and engage at least a portion of the finish of the container to which the closure 10 is to be applied. Preferably, the annular skirt portion of the closure 10 has a plurality of vertical ribs 15 on its outside to facilitate gripping the closure during the application and the removal of the closure 10.

The annular skirt portion 14 of the closure 10 is provided with a radially inwardly projecting and helically extending thread 16 which, preferably, is non-interrupted and which is formed integrally with the annular skirt portion 14. The thread 16 permits the closure 10 to be applied to a container having a finish with a complemental helical thread by a screwing on motion, and to be removed from such finish by an unscrewing motion. A lower marginal portion 18 of the annular skirt portion 14 of the closure 10 is separated from an upper portion 19 of the annular skirt portion 14 by a circumferentially extending weakening line 20 of reduced thickness, the weakening line 20 being adapted to fracture under relatively low loads to permit the marginal portion 18 of the annular skirt portion 14 of the closure 10 to be separated from the upper portion 19 of the annular skirt portion 14.

The marginal portion 18 of the annular skirt portion 14 of the closure 10 is provided with a circumferential series of spaced apart wings 22 extending inwardly and non-radially therefrom. The wings 22, by virtue of their non-radial orientation, are adapted to be deflected inwardly by a radial flange on the finish of a container as the closure 10 is applied to the finish of the container and to engage the underside of the flange when the closure 10 is securely applied to the container. Thus, upon the removal of the closure 10 from the container, the wings 22 will be prevented from rising with respect to the finish of the container by virtue of their engagement with the underside of the flange of the container, and, consequently, this will impose an axial load on the lower marginal portion 18 of the annular skirt portion 14 which will cause the annular skirt portion 14 to fracture in a circumferential pattern at the weakening line 20. This fracturing of the annular skirt portion 14 at the weakening line 20 will provide a visually detectable indication of the first opening of the package that includes the closure 10 and a container to which the closure 10 has been applied, or of an attempted opening of such package, to thereby warn a consumer or retailer of the possible opening of the package for the purpose of tampering with its contents.

Closures according to the design of the closure 10 may be readily and relatively inexpensively mass-produced from known compositions of rigid thermoplastic materials, the principal ingredient of which is a material such as high density polyethylene, polypropylene, or polyethylene terephthalate, by known types of molding processes and equipment, including injection molding processes and equipment and compression molding processes and equipment. In any such molding process, the molding tooling includes a portion, commonly described as a core pin, against which the inside surface of the closure 10, including the helical thread 16 and the wings 22, is formed. At the conclusion of the molding process, the closure 10 is removed from the core pin of the associated molding tooling, and heretofore this has been done by a stripping step, that is, by a step which does not involve any relative rotation between the closure and the core pin during the removal of the closure from the core pin. However, as is recognized in the art, when a molded plastic closure is to be removed from the core pin of the molding tooling by stripping, it must be provided with a helical thread whose configuration is strippable from the core pin. Specifically, this requires that the top surface of the helical thread, in a vertical plane through the central axis of the closure, be at a more substantial angle from the horizontal than would be the case if the closure were to be removed from the core pin by unscrewing it therefrom, and this helical thread configuration, unfortunately, also makes the closure more strippable from the finish of the container to which it is applied.

Figure 5:
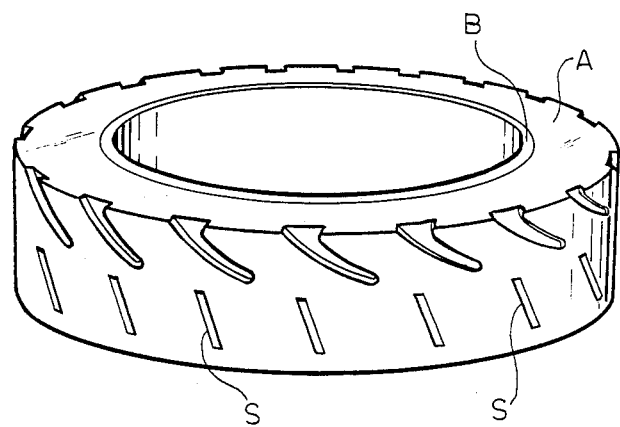
FIG. 5 is a perspective view of an element of the closure molding tooling that is shown in FIG. 4.
Figure 2:
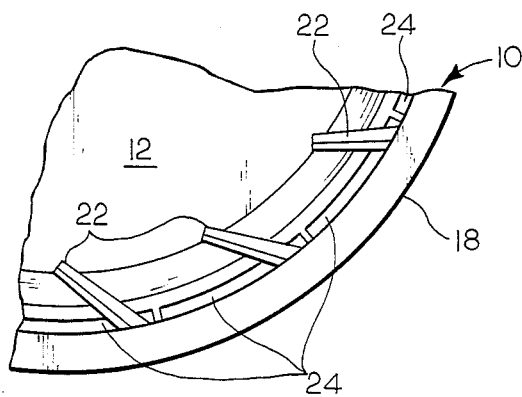
FIG. 2 is a fragmentary view taken on line 2—2 of FIG. 1.
Figure 4:
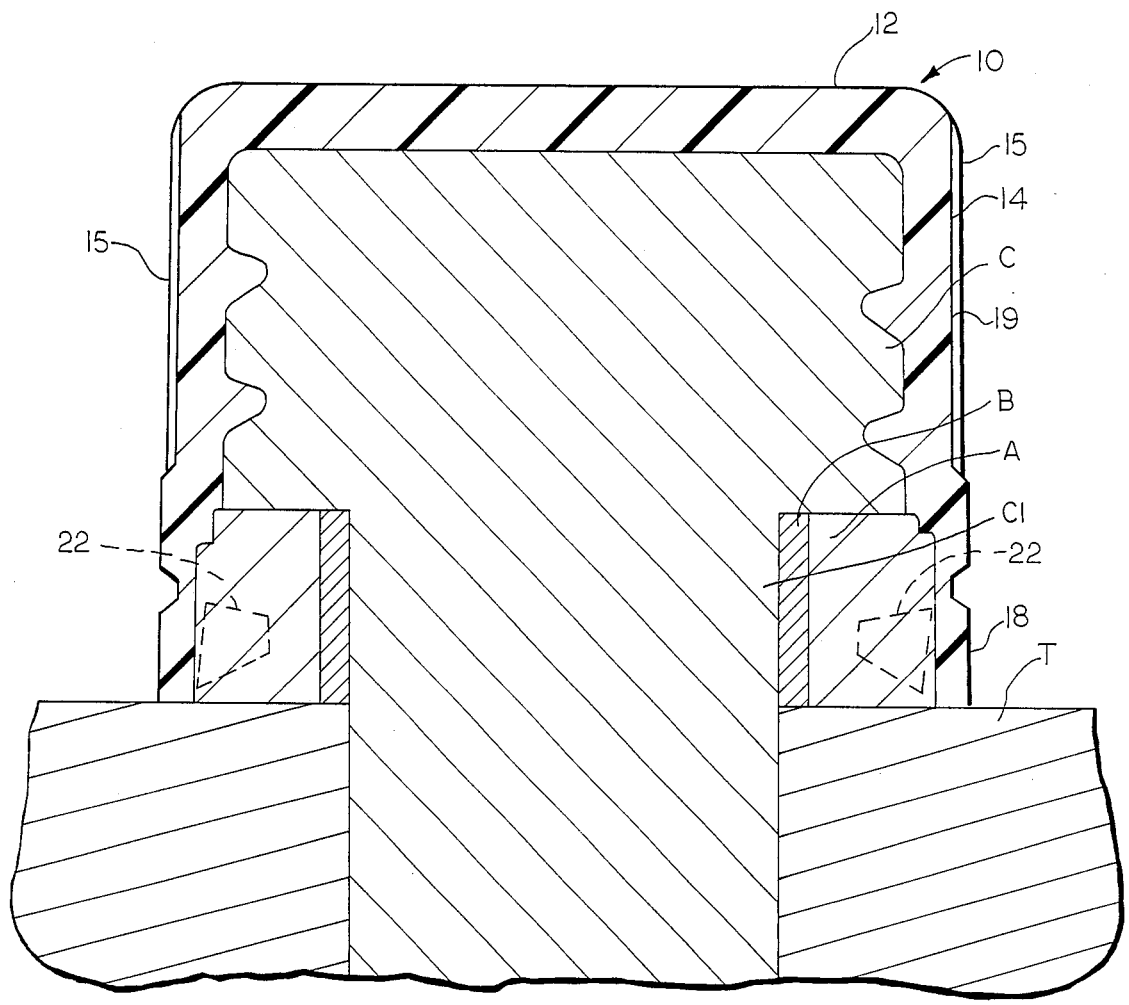
FIG. 4 is a sectional view showing the closure of FIGS. 1 through 3 in association with certain portions of the tooling that are used in the molding of such closure.

As is shown in FIGS. 4 and 5, according to the present invention the closure 10 can be molded by a process in which it is removed from a core pin C of molding tooling T by providing the core pin C with a portion C1 of reduced diameter. The portion C1 of the core pin C is surrounded by an annular portion A which is rotatable with respect to the portion C1 of the core pin C, a bushing B being provided to facilitate the rotation of the annular portion A with respect to the portion C1 of the core pin C. In general, the annular portion A of the core pin C is the portion against which the lower portion of the annular skirt 14 of the closure 10, including the marginal portion 18, is formed, and includes slots S in which the wings 22 are formed. To facilitate the removal of the closure 10 from the core pin C by unscrewing the closure 10 from the core pin C, and to thereby permit the molding of a closure 10 with a configuration of the helical thread 16 that has good resistance to stripping from the container to which the closure 10 is applied, the lower portion of the annular skirt 14 of the closure 10 is provided with a circumferential series of spaced apart ribs 24 which extend inwardly and downwardly from the annular skirt 14 of the closure 10. The ribs 24 are located slightly above the wings 22 and each of the ribs 24 extends at an angle, with respect to a horizontal plane, which is opposite to the helical angle of the helical thread 16 and which, in magnitude, is at least as great as the helical angle of the helical thread 16 and is preferably somewhat greater than such helical angle. Further, the ribs 24 are positioned so that they are molded against the outside of the annular portion A of the core pin C. Thus, when the closure 10 is removed from the core pin C by unscrewing it therefrom, rotation will be imparted to the annular portion A of the core pin C by the ribs 24 which will be in the same direction as the direction of the unscrewing of the closure 10 from the core pin C, and this rotation of the annular portion A of the core pin C will be at a velocity which is greater than the velocity of the unscrewing of the closure 10 which will facilitate the removal of the wings 22 of the closure 10 from the slots S in the annular portion A of the core pin C.

Preferably, the ribs 24 are positioned and sized as to bridge the weakening line 20 and to thereby serve to tether the marginal portion 18 of the annular skirt portion 14 of the closure 10 to the upper portion 19.

Although the best mode contemplated by the inventor for carrying out the present invention as of the filing date hereof has been shown and described herein, it will be apparent to those skilled in the art that suitable modifications, variations and equilvalents may be made without departing from the scope of the invention, such scope being limited solely by the terms of the following claims.

What is claimed is:

1. A molded plastic closure for application to the finish of a container, said closure having a vertically extending central axis and being molded by a process in which it is unscrewed from a core pin of tooling used in the process, said closure comprising:
   a top panel portion adapted to span the finish of the container; and
   an annular skirt portion extending downwardly from said top panel portion, said annular skirt portion having an inside and terminating in an annular marginal portion at the bottom thereof, said annular skirt portion including an upper portion disposed about said annular marginal position and comprising;
   thread means extending at a helical angle with respect to said central axis of said closure and projecting inwardly from said inside of said upper portion of said annular skirt portion, whereby said closure may be applied to a container having a finish with complemental helically extending thread means by a screwing on action and removed from the container by an unscrewing action;
   circumferentially extending weakening line means positioned between said upper portion of said annular skirt portion and said annular marginal portion of said annular skirt portion, said circumferentially extending weakening line means permitting the separation of said annular marginal portion of said annular skirt portion from said upper portion of said annular skirt portion;
   a circumferential series of spaced apart wings projecting non-radially inwardly from said inside of said annular skirt portion of said closure at locations below said circumferentially extending weakening line means, said wings being adapted to engage a portion of the finish of the container to prevent the removal of said annular marginal portion from the finish of the container when said closure is removed from the container; and
   rib means projecting inwardly from said inside of said upper portion of said annular skirt portion of said closure at a location above but adjacent to said weakening line means of said annular skirt portion of said closure, said rib means further extending downwardly with respect to a horizontal plane at an angle which is the opposite of said helical angle of said thread means and which is at least as great as said helical angle, said angle being less than 90° with respect to said horizontal plane, whereby said rib means will impart rotation to a rotatable portion of the core pin of the tooling which is used in the molding of said wings of said closure with respect to the portion of the core pin which is used in the molding of said thread means during the unscrewing of said closure from the core pin, the rotation of the rotatable portion of the core pin being directed in the same direction as the direction of the unscrewing of said closure, whereby said wings may be readily removed from the core pin during the unscrewing of said closure from the core pin.

2. A molded plastic closure according to claim 1 wherein said top panel portion and said annular skirt portion are molded in a single piece from a thermoplastic material.

3. A molded plastic closure according to claim 2 wherein said thermoplastic material has, as its major ingredient, a material selected from the group consisting of high density polyethylene, polypropylene and polyethylene terepthalate.

4. A molded plastic closure according to claim 2 in which said closure is molded by a process that is selected from the group consisting of injection molding and compression molding.

5. A molded plastic closure according to claim 1 wherein said rib means comprises a plurality of ribs disposed in spaced-apart relationship in a circumferential pattern, each of said plurality of ribs projecting inwardly from said inside of said upper portion of said annular skirt portion and extending downwardly with respect to said horizontal plane at an angle which is the opposite of said helical angle of said thread means and which is at least as great as said helical angle.

6. A molded plastic closure according to claim 5 wherein at least one of said ribs bridges said upper portion and said annular marginal portion of said annular skirt portion and serves to tether said upper portion of said annular skirt portion to said annular marginal portion of said annular skirt portion.

7. A molded plastic closure according to claim 1 wherein said thread means comprises a single, non-interrupted thread.

* * * * *